Patented June 28, 1932

1,865,191

UNITED STATES PATENT OFFICE

OTTO JORDAN, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

CELLULOSE NITRATE LACQUER

No Drawing. Application filed July 5, 1928, Serial No. 290,684, and in Germany August 1, 1925.

The present invention relates to new and improved cellulose nitrate lacquers for application by spraying. The use of such lacquers has continuously increased due to a considerable saving in time in the application of the lacquers in comparison with the old method of applying lacquers by means of a brush. Lacquers for application by spraying should dry as rapidly as possible without being inferior to lacquers for application by the brush as regards the capability of adhering to the support and the lustre and brilliancy of the finished coating.

For these reasons only a small number of the many known solvents for cellulose nitrate lacquers can be employed in the manufacture of lacquers for application by spraying. Among these, butyl acetate, isobutyl acetate and amyl acetate have been largely used in practice, though they possess a very strong and irritating smell, owing to which their use is often attended with trouble.

Attempts have therefore been made to find out solvents which are similar to the said acetates as regards their volatility and other valuable properties, but do not smell at all or only very slightly and do not possess irritating properties. However, the known solvents with only a slight smell, for example lactic esters and the like, possess too low a volatility, so that they can be added to rapidly drying lacquers for application by spraying only in very small quantities.

I have now found that the dialkyl-ethers of propylene glycol corresponding to the general formula $RO-C_3H_6-OR'$ (in which R indicates an alkyl group with from 1 to 4 carbon atoms and R' means an alkyl group with from 2 to 4 carbon atoms), possess a volatility suitable for their use in lacquers for application by spraying and have only a slight smell.

The said ethers may be employed either alone or in mixture with each other. They are capable of dissolving all cellulose nitrates coming into consideration in practice; the resulting solutions may be diluted with large amounts of diluents as are usual in the lacquer industry, such as methyl or ethyl alcohol, benzene, toluene, xylene, benzine or the like, without precipitation of the dissolved cellulose nitrate taking place. Small quantities of the usual solvents such as ketones, esters, monoalkyl ethers of glycols and the like, may also be added to the lacquers according to my present invention.

The aforesaid propylene glycol dialkylethers possess a very good dissolving power also for many resins, so that I may incorporate resins compatible with the cellulose nitrate with the cellulose nitrate lacquers according to my present invention and thereby increase the property of adhering to the support, the lustre, hardness and other properties. Suitable resins are for example ester resins, dammar, elemi and the like, and particularly valuable are synthetic resins prepared from cyclic ketones; I prefer to use such resins of the last-mentioned kind as are produced from a cyclic ketone, such as cyclohexanone, and a phenol, with or without an aldehyde.

I may also add to my improved lacquers plasticizers, fillers, coloring matters and other additions usual in the lacquer industry, for example drying oils. An addition of a softener or plasticizing agent is particularly advantageous, if resins be present in the lacquer. For the production of enamelling lacquers, I prefer to incorporate the coloring matters with the lacquers in so fine a state of dispersion, that they settle not at all or only in an insignificant amount even on prolonged standing, for example in accordance with the U. S. Patent No. 1,589,700.

Everybody skilled in the art will understand from the above explanations that by suitably selecting the kind of cellulose nitrate, the additional solvent or solvents, if such be employed, the diluent or diluents, the resin and the other constituents, and the proportions thereof, I may vary the time required for drying, the viscosity, the smell and the other properties of my improved lacquers in accordance with all requirements of practice. Generally I prefer to employ mixtures of solvents and diluents, from 20 to 60 per cent of which consists of one or more of the aforesaid glycol dialkyl-ethers, and to produce lacquers containing at least 8 per cent of cellulose nitrate. The content of cellulose nitrate mainly depends on the viscosity of the cellulose nitrate employed and is usually varied between 8 and 15 per cent by weight of the lacquer, and the content of softener may be raised up to 60 per cent by weight of the dry weight of the nitrocellulose employed.

The following example will further illustrate the nature of my invention which however is not limited thereto. The parts are by weight.

*Example.*—100 parts of cellulose nitrate, 40 parts of a resin obtainable by condensing cyclohexanone and 40 parts of dibutyl phthalate are dissolved in a mixture of 100 parts of propylene glycol monoisopropyl ether, 200 parts of propylene glycol diethyl ether, 50 parts of butanol and 100 parts of ethylene glycol diethyl ether, whereupon 100 parts of ethyl alcohol and 270 parts of benzene are added. Fillers, coloring matter and the like can be incorporated in the usual manner with the lacquer obtained, if so desired.

This application is a continuation in part of my copending application for Patent Ser. No. 123,016, filed July 16, 1926.

What I claim is:—

1. A lacquer for application by spraying comprising cellulose nitrate, an artificial cyclic ketone resin, and a solvent containing at least 20 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms).

2. A lacquer for application by spraying comprising cellulose nitrate, an artificial cyclic ketone resin, and a solvent containing between 20 and 60 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms).

3. A lacquer for application by spraying comprising cellulose nitrate, an artificial resin from a cyclic ketone, formaldehyde and a phenol, a softener, and a solvent containing at least 20 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms).

4. A lacquer for application by spraying comprising cellulose nitrate, an artificial resin from a cyclic ketone, formaldehyde and a phenol, and a solvent containing between 20 and 60 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms).

5. A lacquer for application by spraying comprising cellulose nitrate, an artificial resin from a cyclic ketone, formaldehyde and a phenol, and a solvent containing at least 20 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms), the cellulose nitrate amounting to at least 8 per cent by weight of the lacquer.

6. A lacquer for application by spraying comprising cellulose nitrate, an artificial resin from a cyclic ketone, formaldehyde and a phenol, and a solvent containing between 20 and 60 per cent of a dialkyl-ether of propylene glycol corresponding to the general formula $RO-C_3H_6-OR'$ (in which R indicates an alkyl group with from 1 to 4 carbon atoms and R' means an alkyl group with from 2 to 4 carbon atoms), the cellulose nitrate amounting to at least 8 per cent by weight of the lacquer.

7. A lacquer for application by spraying comprising cellulose nitrate, an artificial cyclic ketone resin and a solvent containing at least 20 per cent of propylene glycol diethyl ether.

8. A lacquer for application by spraying comprising cellulose nitrate, an artificial cyclic ketone resin and a solvent containing ethylene glycol diethyl ether and at least 20 per cent of propylene glycol diethyl ether.

In testimony whereof I have hereunto set my hand.

OTTO JORDAN.